United States Patent
Lewis

(10) Patent No.: US 7,315,873 B2
(45) Date of Patent: Jan. 1, 2008

(54) DEPTH COUNTER USED TO REDUCE NUMBER OF ITEMS TO CONSIDER FOR LOOP DETECTION IN A REFERENCE-COUNTING STORAGE RECLAMATION PROGRAM

(75) Inventor: Russell L. Lewis, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 470 days.

(21) Appl. No.: 10/619,634

(22) Filed: Jul. 15, 2003

(65) Prior Publication Data

US 2005/0015417 A1 Jan. 20, 2005

(51) Int. Cl.
*G06F 12/00* (2006.01)
*G06F 17/30* (2006.01)
*G06F 7/00* (2006.01)
*G06F 17/00* (2006.01)
*G06F 13/00* (2006.01)
*G06F 13/28* (2006.01)

(52) U.S. Cl. .................. 707/206; 707/100; 707/103 R; 711/133; 711/134; 711/135; 711/136; 711/170

(58) Field of Classification Search ................ 707/206; 717/128
See application file for complete search history.

(56) References Cited

U.S. PATENT DOCUMENTS

| | | |
|---|---|---|
| 5,920,876 A | 7/1999 | Ungar et al. |
| 6,038,572 A | 3/2000 | Schwartz et al. |
| 6,115,782 A | 9/2000 | Wolczko et al. |
| 6,226,761 B1 | 5/2001 | Berstis |
| 6,289,012 B1 | 9/2001 | Harrington et al. |
| 6,317,872 B1 | 11/2001 | Gee et al. |
| 6,338,159 B1 * | 1/2002 | Alexander et al. .......... 717/128 |
| 6,502,110 B1 | 12/2002 | Houldsworth |
| 6,502,213 B1 | 12/2002 | Bowman-Amuah |
| 6,513,155 B1 | 1/2003 | Alexander, III et al. |

(Continued)

OTHER PUBLICATIONS

Peter Dickman, Diffusion Tree Restructuring for Indirect Reference Counting, Jan. 2001, ACM Press, ACM SIGPLAN Notices, vol. 36, Issue 1, pp. 167-177.*

(Continued)

*Primary Examiner*—Don Wong
*Assistant Examiner*—Patrick A. Darno
(74) *Attorney, Agent, or Firm*—Scully, Scott, Murphy & Presser, P.C.

(57) ABSTRACT

A technique for improving the efficiency of a loop detecting, reference counting storage reclamation program in a computer system. A depth value is maintained for data objects in a memory resource to indicate a distance from a global, live data object. A reference count is also maintained based on a number of objects pointing to each object. A particular object is processed by the storage reclamation program when another object that previously pointed to the particular object no longer points to it, e.g., because the object was deleted or reset to point to another object, and when the depth value of the another object is one less than the depth value of the particular object. If the particular object is determined to be live, its depth value, and the depth values of other objects it points to or "roots" are reset. If the particular object is dead, it is cleaned up.

22 Claims, 7 Drawing Sheets

U.S. PATENT DOCUMENTS

2002/0087590 A1* 7/2002 Bacon et al. ............... 707/206
2002/0107880 A1 8/2002 Bacon

OTHER PUBLICATIONS

S. Blackburn and K. McKinley, "Fast Garbage Collection without a Long Wait", The Australian National University Joint Computer Science Technical Report Series, Nov. 2002.

David F. Bacon et al., "Java without the Coffee Breaks: A Nonintrusive Multiprocessor Garbage Collector," Proceedings of the ACM SIGPLAN Conference on Programming Language Design and Implementation, ACM SIGPLAN Notices, vol. 36, No. 5, May 2001.

David F. Bacon et al., "Concurrent Collection if Reference Counted Systems," Proceedings of the 15$^{th}$ European Conference on Object-oriented Programming, J.L. Knudsen, ed., Lecture Notes in Computer Science, vol.2072, pp. 207-235, presented at U.C. Berkeley, Feb. 6, 2001.

* cited by examiner

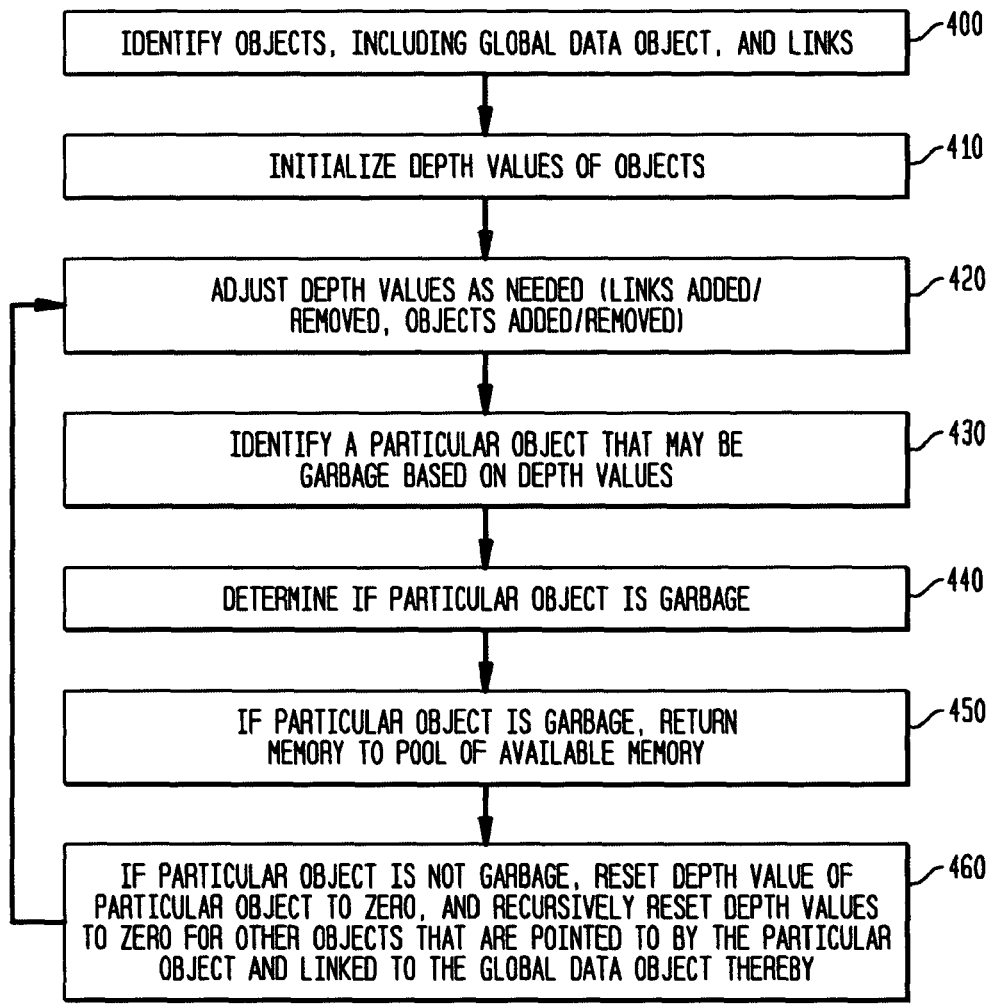
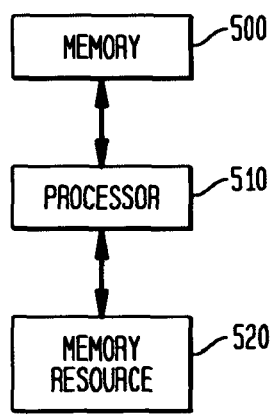

DEPTH COUNTER USED TO REDUCE NUMBER OF ITEMS TO CONSIDER FOR LOOP DETECTION IN A REFERENCE-COUNTING STORAGE RECLAMATION PROGRAM

BACKGROUND OF THE INVENTION

1. Field of Invention

The invention relates generally to the field of allocating memory in a computer system and, more specifically, to a technique for improving the efficiency of a garbage collector.

2. Description of Related Art

Memory resources in computer systems are allocated for storing abstract data objects or items. When the objects are no longer needed, it is necessary to re-allocate the associated memory resources. To this end, garbage collectors, which are part of the run-time system, have been developed to provide automatic periodic storage reclamation of dynamically allocated memory resources. Automatic garbage collection is usually triggered during memory allocation when the amount of free memory falls below some threshold or after a certain number of allocations. Normal execution is suspended and the garbage collector is run. Garbage collection occurs in two phases: identifying unneeded objects, and making their storage available for reallocation. An object in a program is needed, or live, at a given time if the program might access that object in the future. Otherwise, the object is dead. This may occur if the program has abandoned all pointers to it, making future access impossible.

There are two principle approaches to garbage collection. Reference counting garbage collectors maintain a count for each object of the number of pointers to it. An object is therefore dead when its count falls to zero. Tracing collectors identify as live those objects that are accessible either directly or indirectly from a set of root cells, which are typically the registers and named variables of the program. Objects that are not encountered during the trace are considered to be dead. Tracing collectors include copying collectors, which relocate live objects into a new memory area as they encountered during the trace, and marking collectors, which flag live objects during the trace.

Tracing collectors have been much more commonly used due to perceived deficiencies in reference counting. In particular, a problem with reference counting garbage collectors is that they normally cannot detect garbage that has loops, e.g., cyclic data structures, in it. For example, if there is an object "A" that points to an object "B", and "B" points back to "A", then both objects will have non-zero reference counts even when no outside data ever references them. They might be garbage because they are inaccessible, but the algorithm will not recognize that. Thus, any reference counting garbage collector must periodically search for objects that have a non-zero reference count but are inaccessible. This is expensive in terms of time and processing resources, e.g., processor cycles.

BRIEF SUMMARY OF THE INVENTION

To address the above and other issues, the present invention describes a technique for improving the efficiency of a garbage collector.

In a particular aspect of the invention, a garbage collecting method for a memory resource in a computer system is provided. The method includes maintaining, for each of a plurality of objects in the memory resource, a reference count based on a number of objects pointing thereto, and maintaining a depth value based on a distance from a global data object. The method further includes identifying, based on the associated reference count and depth value, which of the plurality of objects are to be processed to determine whether or not they are garbage.

A corresponding computer system and computer program product are also provided.

BRIEF DESCRIPTION OF THE DRAWINGS

These and other features, benefits and advantages of the present invention will become apparent by reference to the following text and figures, with like reference numbers referring to like structures across the views, wherein:

FIG. 4 illustrates a method for improving the efficiency of a garbage collector; and FIG. 5 illustrates a computer system for improving the efficiency of a garbage collector.

DETAILED DESCRIPTION OF THE INVENTION

The present invention describes a technique for improving the efficiency of a garbage collector by reducing the number of objects sent to the garbage collector. The invention provides an indication that certain objects are still accessible and therefore need not be processed by a garbage collector to determine with finality whether they are garbage. The technique may be used, for example, in the loop-detection mechanism for a reference-counting garbage collector. Examples of such a garbage collector are discussed in (1) David F. Bacon et al., "Java without the Coffee Breaks: A Non-intrusive Multiprocessor Garbage Collector," Proceedings of the ACM SIGPLAN Conference on Programming Language Design and Implementation, ACM SIGPLAN Notices, vol. 36, no. 5, May 2001, and (2) David F. Bacon et al., "Concurrent Collection if Reference Counted Systems," Proceedings of the 15th European Conference on Object-oriented Programming, J. L. Knudsen, ed., Lecture Notes in Computer Science, vol. 2072, pp. 207-235, presented at U. C. Berkeley, Feb. 6, 2001, both of which are incorporated herein by reference.

The Bacon et al. loop-detection mechanism for a reference-counting garbage collector is used in the Jalapeno Java Virtual Machine. This program allows Jalapeno's garbage collector to recognize loops and automatically collect them using only the existing state data used by the garbage collector. Since the garbage collector, or "Recycler", does not need to go back to the root of the object hierarchy, it can run easily in the background on any object that Jalapeno determines might be a loop. However, any time a reference to an object is lost, the object is put in Recycler's queue for loop detection to determine with finality whether the object is garbage. The present invention addresses this problem by reducing the number of objects sent to the Recycler or other garbage collector. Note that the invention is not limited to use with the Bacon et al. technique but can be used with any mechanism that does loop detection in a reference counting garbage collector. The term "Recycler" may be used herein as a synonym for "garbage collector", or more specifically, the loop detection mechanism of a reference counting garbage collector.

A series of figures is first presented illustrating how data objects of a memory resource, and links between the objects, are added and removed over time. The figures illustrate why loop detection software is necessary for a reference counting ("refcounting") garbage collector.

Figure 1A:
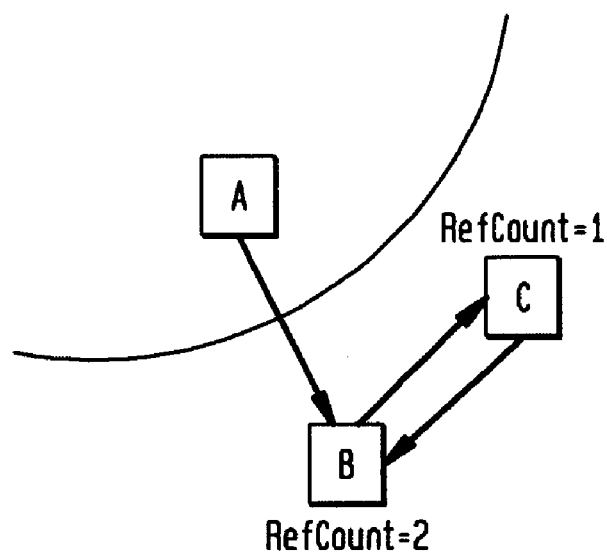
FIG. 1(a) illustrates a first, non-garbage object pointing to a second object, where a loop is formed between the second object and a third object.
Figure 1B:
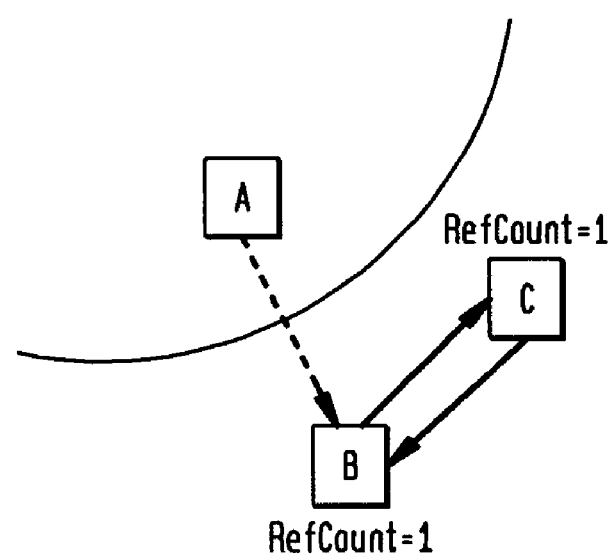
FIG. 1(b) illustrates the arrangement of FIG. 1(a) where the link between the first and second objects is lost.

FIG. 1(a) shows an arrangement of three nodes, e.g., objects, A, B and C. A is known not to be garbage, and it points to B. There is a loop formed between B and C. Notice that the refcount of B is two, since two objects, namely A and C, point to it, while the refcount of C is one since only object B points to it. The refcount of a given object is the number of objects directly pointing to it. FIG. 1(b) shows what happens when the link from A to B is lost. Note that B and C are now both garbage objects since they cannot be accessed. However, neither has a refcount of zero since B is pointed to by C, and C is pointed to by B. Thus, the refcount of each is one. As explained further below, the present invention detects that B and C might be garbage and sends them to the garbage collector to determine with finality whether they are garbage. When an object is determined to be garbage, it is "cleaned up" by returning its associated memory, such as memory cells, to a pool of available memory for reallocation to other objects at a later time.

Figure 2A:
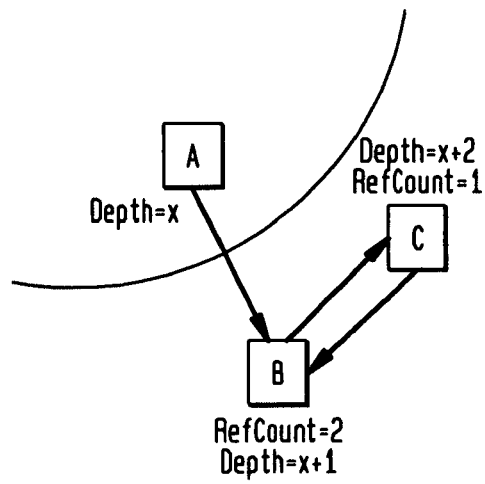
FIG. 2(a) illustrates a first, non-garbage object pointing to a second object, where a loop is formed between the second object and a third object, and respective depth values for the objects are indicated.
Figure 2B:
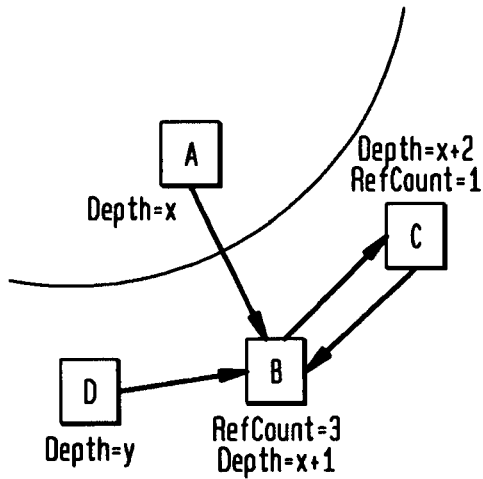
FIG. 2(b) illustrates the arrangement of FIG. 2(a) where a fourth object linked to the second object is added.

The following figures illustrate how depth counters are set up and how they impact the garbage collector. FIG. 2(a) provides the same A-B-C layout as FIG. 1(a), but further includes depth values associated with each node or object. The depth value of an object is the distance of the object from a global data object. For example, A has some depth value (x). Since A is the rooting object of B, B's depth is x+1. Since B is the rooting object of C, C's depth is x+2. A rooting or root object of a given object is an object that points to the given object and links the given object to an object that is always a non-garbage object, e.g., a global data object. Or, the root object can be the global data object itself, as object A is the root object of object B. Global data is data that is known to never be garbage throughout the life of the program. The root object may be in a chain of objects that leads back to the non-garbage object. FIG. 2(b) illustrates a fourth node, D, which is later added. Note that the refcount on B has been incremented to three since the additional object, D, now points to B. Also note that the depth on B is not changed, since B already had a valid depth value, e.g., x+1.

Figure 2C:
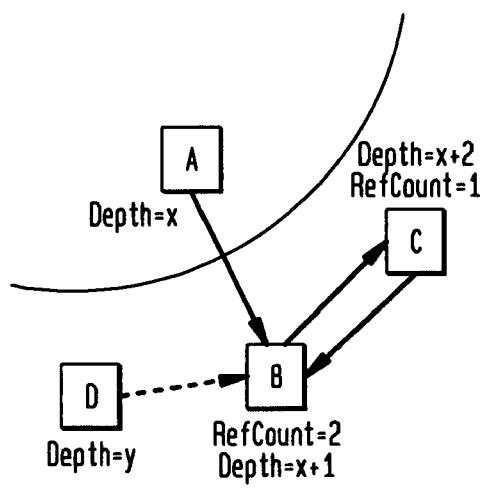
FIG. 2(c) illustrates the arrangement of FIG. 2(b) where the link between the second and fourth objects is lost.

FIG. 2(c) illustrates what happens when the link from D to B is lost. Using conventional techniques, object B would be scheduled for garbage collecting since it is not known if the two refcounts are due to loops. The garbage collector would determine that object B is not garbage since it is pointed to by a non-garbage object A. The present invention avoids this unnecessary processing by the garbage collector by comparing the depth counters of objects D and B. Since the depth of D, i.e., y+1, probably does not equal the depth of B, i.e., x+1, we know that there must be some other object somewhere with a depth of x that has a link to B. The code doesn't have to know that the other object is A. All the code needs to know is that such an object exists. In this case, there is no need for B to be processed by the garbage collector since it is clearly not garbage.

Figure 2D:
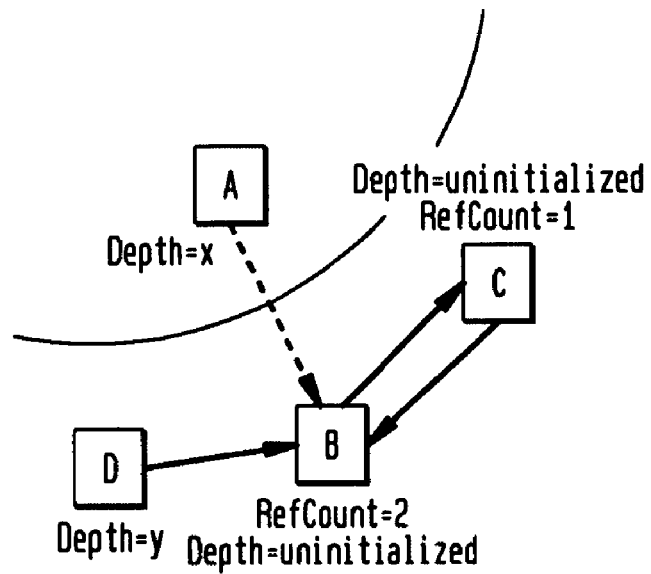
FIG. 2(d) illustrates the arrangement of FIG. 2(b) where the link between the first and second objects is lost.

But, what if the link between object A and B was lost instead, as shown in FIG. 2(d)? In this case, A is the rooting object of B. Therefore, since B now has no rooting object, we don't know if B is garbage or not, and thus we fall back on using the garbage collector. The garbage collector will find out that B is not garbage (because D still has a link to it). However, since the rooting link was lost, all of the depth counts in the loop are set back to an 'uninitialized' status, in accordance with the invention.

Figure 2E:
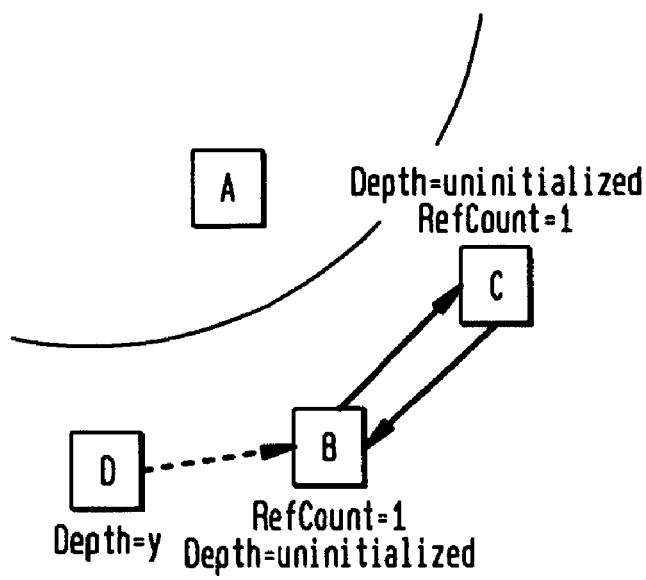
FIG. 2(e) illustrates the arrangement of FIG. 2(d) where the link between the second and fourth objects is also lost.

Finally, what happens when the link from D to B is lost, after the link from A to B had already been lost, as shown in FIG. 2(e)? Remember that the depth of B was 'uninitialized'. Thus, B is scheduled for garbage collecting. In this case, the garbage collector discovers that all external links to B have been lost, so it is garbage. The garbage collector then cleans up objects B (and C).

Figure 3A:
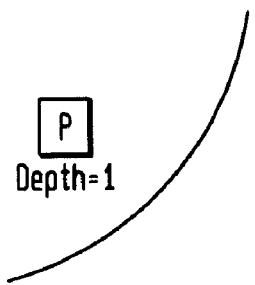
FIG. 3(a) illustrates a single object of global data.
Figure 3B:
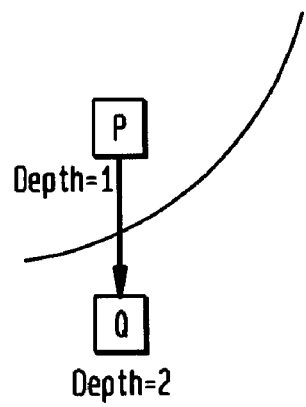
FIG. 3(b) illustrates a second object pointed to by the first object of FIG. 3(a)
Figure 3C:
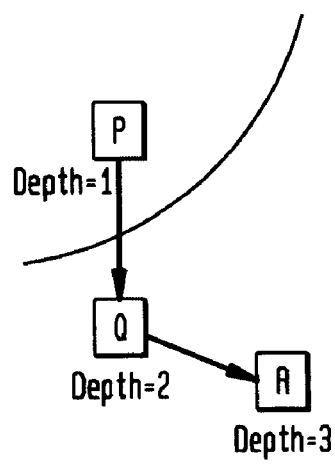
FIG. 3(c) illustrates a third object pointed to by the second object of FIG. 3(b)
Figure 3D:
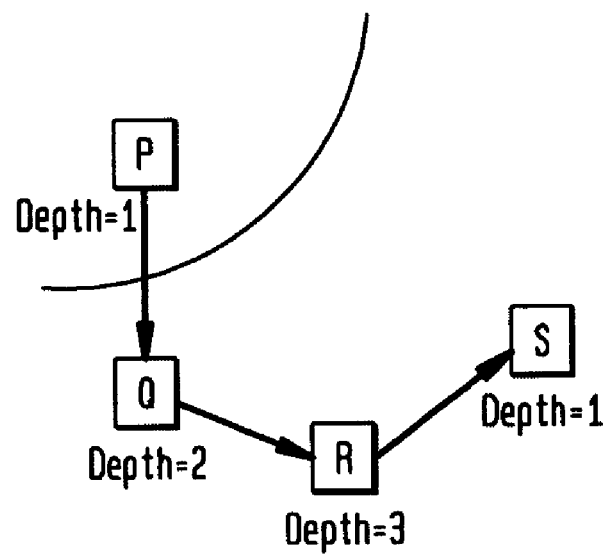
FIG. 3(d) illustrates a fourth object pointed to by the third object of FIG. 3(c)

FIGS. 3(a)-(h) illustrate the initialization of depth values. In each figure, 'initialization'=0 (e.g., the depth value is zero for an uninitialized object) and max depth=3. FIG. 3(a) shows a single object P which is global (i.e., static) data that will never be garbage collected. It is initialized with a depth of one or any desired valid value. FIG. 3(b) shows a new object Q that was created at runtime. Note that it is not global data, and so is available for garbage collection processing. Its depth is initialized to one more than the depth of its rooting object. FIGS. 3(c) and (d) show the creation of two additional objects R and S. Note that object S has a depth of one since it is rooted by an object, R, with a depth of three, and the max depth is three. Thus, incrementing of the depth value starts over at one. This is an imprecise depth counter. Also notice that, when the depth value starts over at one, e.g., wraps around, it skips over the "uninitialized" value (depth=0), since we don't want to imply that the depth is unknown.

Figure 3E:
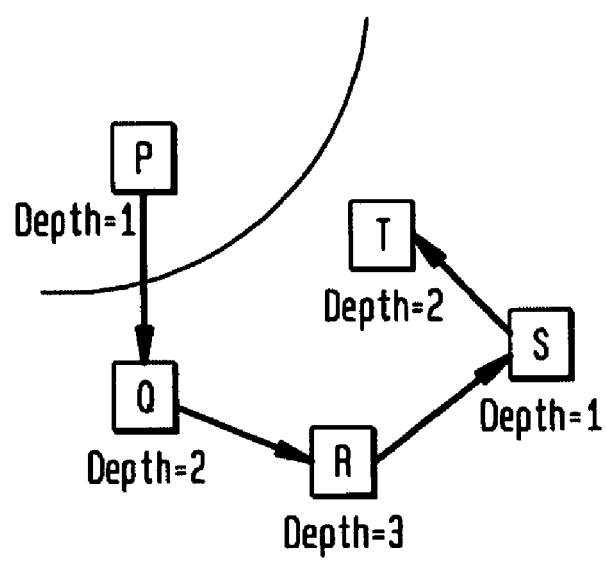
FIG. 3(e) illustrates a fifth object pointed to by the fourth object of FIG. 3(d)
Figure 3F:
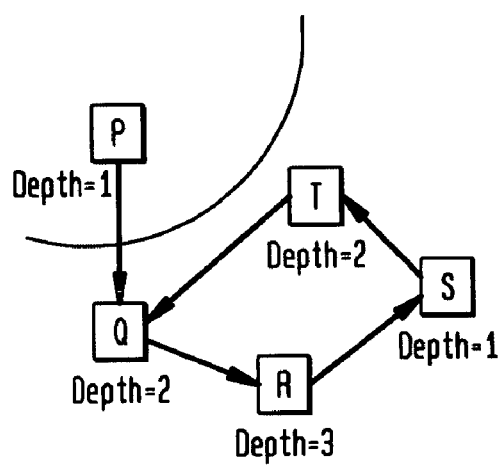
FIG. 3(f) illustrates the fifth object of FIG. 3(e) pointing to the second object.

FIGS. 3(e) and (f) show the creation of one more object, T, and then a loop back to Q. Note that we do not reset the depth on the old object, Q that is looped back on, since it already has a valid depth value.

Figure 3G:
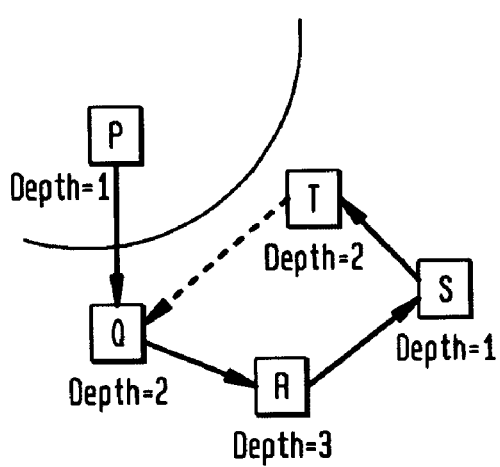
FIG. 3(g) illustrates the arrangement of FIG. 3(f) where the link between the second and fifth objects is lost.

FIGS. 3(g) and (h) show the loss of two different links. In FIG. 3(g), the link between T and Q is lost. However, this does not cause the garbage collector to run because the depth values of T and Q make it clear that the link is not a rooting link. The link between P and Q is the rooting link for Q. In accordance with the invention, an object is identified to be processed by a garbage collector to determine with finality whether it is garbage when it is determined that a second object previously pointing to the first object is no longer pointing to it (e.g., due to deletion of the second object, or deletion of the link from the second to the first object), and the depth value of the second object is one less than the depth value of the first object. Here, the depth value of the second object, e.g., T, is not one less than the depth value of the first object, e.g., Q. Both depth values are the same, i.e., two. Since the garbage collector doesn't run, processor cycles are saved.

Figure 3H:
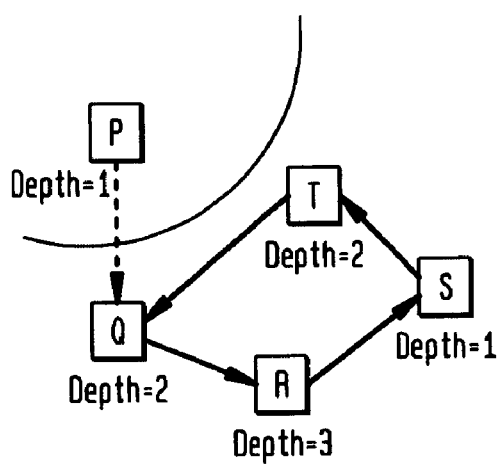
FIG. 3(h) illustrates the arrangement of FIG. 3(f) where the link between the first and second objects is lost.

On the other hand, FIG. 3(h) shows the loss of the link between objects P and Q. In this case, the depth counters show that the link might be the (only) rooting link. This is true since the depth value of the second object, e.g., P, is one less than the depth value of the first object, e.g., Q. That is, P's depth value of one is one less than Q's depth value of two. Thus, object Q is processed to determine with finality whether or not it is garbage. The garbage collector determines that the object Q and, in fact, the entire loop Q-R-S-T, is garbage since there is no link back to the global data P. All four objects Q, R, S and T are therefore cleaned up. Essentially, comparison of the depth values indicates whether there is a break in a chain of rooting objects.

Examples of a C-language like pseudo code for achieving the functionality discussed herein are now provided. The garbage collector may add a "depth" field to garbage collection metadata stored with each object. Consider two objects, FOO and BAR. A pointer in FOO is being set to refer to BAR. The garbage collector checks the depth fields; if the field in FOO is nonzero and the field in BAR is zero, then the field in BAR is set to FOO's depth+1:

```
if(FOO.depth !=0 &&
   BAR.depth == 0)
      BAR.depth=FOO.depth+1
```

Now consider two other objects, BAZ and BAM. BAZ used to point to BAM, but will not anymore; either BAZ is being destroyed, or it is being reset to point somewhere else. Now, if this is the last reference to BAM, then the garbage collector knows trivially that BAM may be cleaned up. But what if it is not? If references remain, are they all loop references? Or, are some valid, external references? To determine this, the depth fields are compared. If BAZ's is one more than BAM's, then the object is sent to the garbage collector for consideration:

```
BAM.refCount--;
if(BAM.refCount ==0)
     GarbageCollect(BAM);
else if (BAM.depth == 0 ||
     BAM.depth == BAZ.depth+1)
     SendToRecyclerQueue(BAM); //check with Recycler - might be
                               // garbage or might not; else do nothing.
```

At some later time, the garbage collector will consider this object for garbage collection. If it finds that BAZ is garbage, then it is cleaned up. If not, then we know that there remains at least one reference to BAZ from some other object. However, we do not know what that object is, so we set the depth to zero. Likewise, we recurse into all of the objects that it points to and set their depth counters to zero:

```
void RecursivelySetDepthOfAllReferencesToZero(Object OBJ)
{
     int myOldDepth = OBJ.depth;
     OBJ.depth = 0;
     for(each "Object ref" in the list of non-null references in OBJ)
          if(ref.depth != 0 &&       //don't recurse into things
          // with depth==0 so we don't run forever when tracing loops
                ref.depth == myOldDepth) //don't recurse into
     // things owned by somebody else, else we could zero out everything
                RecursivelySetDepthOfAllReferencesToZero(ref);
}
void Recycler(Object OBJ)
{
     // do the Recycler checks here
     if(objectIsGarbage)
          GarbageCollect(OBJ);
     else
          RecursivelySetDepthOfAllReferencesToZero(OBJ):
}
```

What this means is that any object with a nonzero depth counter is either already scheduled for consideration by the garbage collector, or known to not be garbage. If an object has a zero depth counter, we don't know anything about it. Any time that a reference to it is lost, we schedule it for the garbage collector. Later, if a new reference to the object is added and the referring object has a nonzero depth counter, then the depth counter is redefined to a new value. What this means is that often, when we lose a reference to an object, we are able to trivially detect that the object is not garbage and thus skip the (expensive) garbage collector check. Sometimes, there will not be enough information available (e.g., when depth counter==0), in which case we run the garbage collector check on everything.

If the depth counter ever overflows, then the new depth value calculated is zero, which will be later interpreted as "nothing is known about the depth of this node". This means that overflow of the counter will cause extra objects to be sent to the garbage collector, but will not cause any objects to be ignored. Thus, for performance reasons, it is desirable to have a large depth field (to prevent overflow), but having a too-small depth field will not lead to any memory leaks, nor will it cause any false garbage collection of still-useful data.

Regarding the use of data stacks, reference variables on a stack are not part of any object, and as such cannot be said to have a depth field; thus we cannot calculate a new depth field for objects referred to by stack variables. However, the stack variable does function as its referring object. There are three possible solutions:

1) Leave the depth field at zero.
2) Consider the stack to be "depth zero" and as such initialize the depth field to one. When the references on the stack go out of scope, schedule the objects for garbage collecting.
3) For each stack frame (or stack variable), have the compiler assign a "false depth counter" value and initialize the depth counter appropriately. Later, when the variable goes out of scope, follow the normal depth counter comparison rules, using that same "false depth counter" value.

Generally, the invention allows us to skip garbage collector checks in very specific situations because our algorithm guarantees that:

If an object has a nonzero depth counter, then there is at least one object with a depth counter of one less that is either:

a) Not garbage, or b) Scheduled for consideration by the garbage collector.

Thus, in the examples of BAZ and BAM above, if BAM has a nonzero depth counter and the BAM. depth is NOT BAZ. depth+1, then we know for sure that there exists at least one other non-garbage object that still has a reference to that object; thus, the object is not garbage.

When we process an object using the garbage collector and find that it is not garbage, then we must conclude that there is a non-garbage object left that has a reference to the object. However, we do not know anything about that object, and so we set the depth counter to zero. This is called "orphaning" the object; the reference that is keeping it alive is not known. Now, once that object is orphaned, then we need to orphan any objects that got their depth counters from it. Thus, we recurse down the tree, setting depth counters to zero. We don't recurs into any objects that already have a depth counter of zero (or else we'd go forever around loops), nor do we orphan any objects that have some different depth value (since we know that they must have some other reference to them remaining). This process of orphaning guarantees that later, if any of these objects are considered, they will be sent to the garbage collector. This will be true for each of the orphaned objects until a new reference is assigned to it.

FIG. 4 provides a general overview of the method for improving the efficiency of a garbage collector as discussed above. At block 400, the data objects that are stored in a memory resource are identified, including one or more global, or non-garbage, data objects. The links among the objects are also identified to determine which objects point to which other objects. At block 410, the depth values of the objects are initialized, e.g., when the objects are first created. At block 420, the depth values of the objects are adjusted as need, e.g., as links between objects are added and removed, and as objects themselves are added and removed. At block 430, a particular object is identified as potentially being garbage based on its depth values. The refcount is assumed to be non-zero in this case. This step may also include identifying objects with a refcount of zero, where it is clear that an object with a refcount of zero is garbage. That is, all non-garbage objects always have a nonzero reference count, while some garbage objects have nonzero reference counts (because they are part of garbage loops).

At block 440, the object that is identified as potentially being garbage is processed by a loop-detecting reference counting garbage collector. At block 450, if the object is determined to be garbage by the garbage collector, it is cleaned up by returning the portion of memory it is using to a pool of available memory for subsequent re-allocation. At block 460, if the particular object is not found to be garbage by the garbage collector, the depth value of the object is reset to zero, and the depth values for other objects that are pointed to by the particular object and linked to a global data object by the particular object (e.g., rooted by the particular object) are also reset to zero. The depth values for other objects that are pointed to by the particular object but not linked to a global data object by the particular object are not reset.

Note that the depth value is orthogonal to the reference count (refcount). When a particular object has a valid depth value, this means that there exists at least one object which fulfills the following conditions:

1) Is known not to be garbage, or is being considered by the garbage collector;
2) Has a pointer to the particular object; and
3) Has a depth value of exactly one less than the particular object.

This allows us to conclude that the particular object is not garbage, or that it will be cleaned up soon by the garbage collector.

These guarantees can be made because of how the depth values are constructed. No object is given a depth value until we create a link to it from another object that already has a valid depth value. The only objects that start out with valid depth values are global data. Thus, any object which has a valid depth value must have a series of links in a chain from the global data to it. We do not know how long that chain is, nor do we know how many paths there might be from global data to the particular object.

The invention provides many benefits. First of all, in a program, it is common to create many "temporary links" to an object. For instance, when one passes a pointer to an object into a function, that pointer is an object that has another reference to the object. Thus, a reference counting garbage collector must increment the counter when these links are created, and must decrement the reference count when they are lost. What happens when that reference is lost? Conventionally, the object must be considered for garbage collecting since it is possible that the object was modified inside of the function, and that the object is garbage. However, the invention allows us to skip the garbage collecting process in most of these cases. The reason for this is that the object already has a certain depth value. When the new pointer to the object is created, the reference count is incremented but the depth value is not altered because the object already has a valid value. When the temporary reference is lost, we compare the depth value of the reference to that of the object. In most cases, they will not line up, e.g., agree. This tells us that there must be another linked object somewhere that roots the object (i.e., points to the object and links it to a global data object).

From time to time, it will randomly occur that the temporary reference has the depth value such that it looks like it might be a rooting reference. In this case, we run the garbage collector. If the garbage collector finds out that the object is not garbage, the object is kept around, but is depth value is reset because we don't know the depth value of the rooting reference. What happens, on the other hand, if the function modified the object such that it really is garbage? We can know for sure, when we lose the temporary reference, that one of three things is true:

1) The links that used to root the object no longer exist. When the temporary reference is lost, the reference count will go to zero, and the object will be garbage collected without even running the Recycler or other loop detection mechanism since we know immediately that an object with refcount=0 is garbage.
2) The garbage collection routine has already run, and it is determined that the object isn't garbage yet (because the temporary reference was still valid), but all the depths are reset because the rooting reference was lost. In this case, when the temporary reference is lost, we look and see that the object has an invalid depth. Thus, we fall back on our previous methods. The garbage collection routine runs again, and finds out (this time) that the object is garbage.
3) The garbage collection routine is scheduled to run, but hasn't yet. Seeing that the depth values don't line up, we don't schedule it to run again, but it will run eventually and clean up the garbage. If we schedule the garbage collection routine to run a second time, that's ok—the second request is just ignored.

FIG. 5 illustrates a computer system for improving the efficiency of a garbage collector. Block 520 represents a memory resource in which data objects of interest are stored. The invention assists in the reclamation of portions of the memory resource 520 that are occupied by garbage data, that is, data that is no longer needed. A processor 510 executes computer code devices such as software, firmware, and/or microcode in a known manner for carrying out the functionality discussed herein. The processor 510 may use a memory 500 to store information such as metadata, including the depth values, for the data objects. Or, a portion of the memory resource 520 may be used for this purpose.

The invention has been described herein with reference to particular exemplary embodiments. Certain alterations and modifications may be apparent to those skilled in the art, without departing from the scope of the invention. The exemplary embodiments are meant to be illustrative, not limiting of the scope of the invention, which is defined by the appended claims.

What is claimed is:

1. A method for determining if an object in a memory resource in a computer system is a candidate for garbage collection, comprising:
for each of a plurality of objects in the memory resource, maintaining a reference count based on a number of objects pointing thereto, and maintaining a depth value based on a distance from a global data object in a reference chain, the step of maintaining a depth value further including at least keeping an existing depth value associated with an object when a new link is added from another object to the object if the existing depth value associated with the object is a valid depth value and if the existing depth value associated with the object is an uninitialized value, changing the existing depth value associated with the object to one more than a depth value associated with said another object; and
identifying, based on the associated reference count and depth value, which of the plurality of objects are processed to determine whether or not they are garbage;
wherein each of the plurality of objects can be pointed to by one or more other objects and wherein each of the plurality of objects can be part of, and have different positions in, different reference chains such that the reference count and depth value change as the other objects that point to each of the plurality of objects change.

2. The method of claim 1, wherein:
for each object, the depth value is maintained by providing a depth field in metadata associated with the object.

3. The method of claim 1, wherein:
a first of the objects is identified for processing when it is determined that a second of the objects previously pointing thereto is no longer pointing thereto, and the depth value of the second object is one less than the depth value of the first object and the first of the objects is identified as not a garbage collection candidate even when it is determined that the second of the objects previously pointing thereto is no longer pointing thereto and the depth value of the second object is not one less than the depth value of the first object.

4. The method of claim 3, wherein:
the second object is no longer pointing to the first object because the second object was destroyed.

5. The method of claim 3, wherein:
the second object is no longer pointing to the first object because the second object was reset to point to another object.

6. The method of claim 1, wherein: the distance for each of the plurality of objects is based on a number of objects linking the each of the plurality of objects to the global data object.

7. The method of claim 6, wherein:
the objects processed to determine whether or not they are garbage are processed by a loop detection mechanism for a reference counting garbage collector.

8. The method of claim 1, further comprising:
initializing the depth value of a new object created at runtime to one more than the depth value of an object that points to the new object and links the new object to the global data object.

9. The method of claim 1, wherein
when a particular one of the objects that is processed is determined to be garbage, its associated portion of the memory resource is made available for re-allocation.

10. The method of claim 1, wherein
when a particular one of the objects that is processed is determined to be non-garbage, its depth value, and the depth values of other ones of the objects that are pointed to by the particular object and linked to the global data object thereby, are reset.

11. The method of claim 10, wherein:
the depth values of objects that are pointed to by the other ones of the objects whose depth values are reset, and linked to the global data object thereby, are also reset.

12. The method of claim 10, wherein:
the particular object is determined to be non-garbage when it is accessible to outside objects.

13. The method of claim 1, wherein:
when a new linAc is created from a first object of the plurality of objects to a second object of the plurality of objects, and the first object has a valid depth value but the second object does not have a valid depth value, the depth value of the second object is initialized to one more than the depth value of the first object.

14. The method of claim 1, further comprising:
initializing a depth value of the global object to a valid depth value.

15. The method of claim 1, further comprising:
initializing depth values of the plurality of objects to a specified value.

16. A program storage device readable by a machine, tangibly embodying a program of instructions executable by the machine to perform method steps of determining if an object in memory is garbage, the method steps comprising:
for each of a plurality of objects in the memory resource, maintaining a reference count based on a number of objects pointing thereto, and maintaining a depth value based on a distance from a global data object in a reference chain, the step of maintaining a depth value further including at least keeping an existing depth value associated with an object when a new link is added from another object to the object if the existing depth value associated with the object is a valid depth value and if the existing depth value associated with the object is an uninitialized value, changing the existing depth value associated with the object to one more than a depth value associated with said another object; and identifying, based on the associated reference count and depth value, which of the plurality of objects are processed to determine whether or not they are garbage;

wherein each of the plurality of objects can be pointed to by one or more other objects and wherein each of the plurality of objects can be part of, and have different positions in, different reference chains such that the reference count and depth value change as the other objects that point to each of the plurality of objects change.

17. A computer system for determining if an object in memory is garbage, comprising:

a processor and memory for maintaining, for each of a plurality of objects in the memory resource, a reference count based on a number of objects pointing thereto, and maintaining a depth value based on a distance from a global data object in a reference chain, said maintaining a depth value further including at least keeping an existing depth value associated with an object when a new link is added from another object to the object if the existing depth value associated with the object is a valid depth value and if the existing depth value associated with the object is an uninitialized value. changing the existing depth value associated with the object to one more than a depth value associated with said another object, and for identifying, based on the associated reference count and depth value, which of the plurality of objects are processed to determine whether or not they are garbage;

wherein each of the plurality of objects can be pointed to by one or more other objects and wherein each of the plurality of objects can be part of, and have different positions in, different reference chains such that the reference count and depth value change as the other objects that point to each of the plurality of objects change.

18. The method claim 1, wherein the depth value ranges from a first value to a predetermined maximum value and when a depth value associated with a first object reaches the predetermined maximum value, a depth value associated with a second object that links from the first object is wrapped around to the first value.

19. The program storage device of claim 16, wherein the depth value ranges from a first value to a predetermined maximum value and when a depth value associated with a first object reaches the predetermined maximum value, a depth value associated with a second object that links from the first object is wrapped around to the first value.

20. The computer system of claim 17, wherein the depth value ranges from a first value to a predetermined maximum value and when a depth value associated with a first object reaches the predetermined maximum value, a depth value associated with a second object that links from the first object is wrapped around to the first value.

21. The method of claim 1, wherein a first of the objects is identified for processing when it is determined that a second of the objects previously pointing thereto is no longer pointing thereto, and the depth value of the first object is not known.

22. The method of claim 1, further including:

identifying a first of the objects as not being garbage when it is determined that a second of the objects previously pointing thereto is no longer pointing thereto, if the depth value of the first object is known and the depth value of the second object is not one less than the depth value of the first object.

* * * * *